United States Patent
Walker et al.

(10) Patent No.: US 8,407,241 B2
(45) Date of Patent: Mar. 26, 2013

(54) CONTENT MESH SEARCHING

(75) Inventors: Brian P. Walker, Seattle, WA (US);
John A. Solaro, Bellevue, WA (US);
Robert Edward Parkin, Redmond, WA
(US); Rahul R. Deshpande, Bellevue,
WA (US); Cyril S. Bouanna, Bellevue,
WA (US); Brian M. King, Redmond,
WA (US)

(73) Assignee: Microsoft Corporation, Redmond, WA (US)

( * ) Notice: Subject to any disclaimer, the term of this patent is extended or adjusted under 35 U.S.C. 154(b) by 392 days.

(21) Appl. No.: 12/483,253

(22) Filed: Jun. 12, 2009

(65) Prior Publication Data

US 2010/0318554 A1 Dec. 16, 2010

(51) Int. Cl.
*G06F 7/00* (2006.01)
*G06F 17/30* (2006.01)
(52) U.S. Cl. .................. 707/769; 707/783; 709/229
(58) Field of Classification Search .......... 707/600–831;
709/226, 229; 713/165–167
See application file for complete search history.

(56) References Cited

U.S. PATENT DOCUMENTS

| | | | | |
|---|---|---|---|---|
| 7,346,925 | B2 * | 3/2008 | Marcjan | 726/12 |
| 7,389,532 | B2 * | 6/2008 | Swander | 726/11 |
| 7,424,543 | B2 | 9/2008 | Rice, III | |
| 7,451,217 | B2 | 11/2008 | Wardrop | |
| 2008/0005086 | A1 | 1/2008 | Moore | |
| 2008/0082671 | A1 | 4/2008 | Meijer et al. | |
| 2008/0320300 | A1 | 12/2008 | Gkantsidis et al. | |

FOREIGN PATENT DOCUMENTS

| | | |
|---|---|---|
| KR | 1020020050220 A | 6/2002 |
| KR | 102004008171 A | 1/2004 |
| KR | 1020040047656 A | 6/2004 |
| KR | 1020040101425 A | 12/2004 |

OTHER PUBLICATIONS

Jurjens et al., Model-based design and analysis of permission-based security, 2005, IEEE, 224-233.*
"International Search Report", Mailed Date: Jan. 3, 2011, Application No. PCT/US2010/038215, Filed Date: Jun. 10, 2010, pp. 8.
Zahariadis, et al."Scalable Content Delivery over P2P Convergent Networks", Retrieved at<<http://ieeexplore.ieee.org/stamp/stamp.jsp?arnumber=4559463&isnumber=4559407>>, Feb. 2, 2009, pp. 4.
Sentinelli, et al."Will IPTV Ride the Peer-to-Peer Stream?", Retrieved at<<http://www.lk.cs.ucla.edu/PS/marfia.pdf>>, IEEE Communications Magazine • Jun. 2007, pp. 86-92.

(Continued)

*Primary Examiner* — Jean B Fleurantin
(74) *Attorney, Agent, or Firm* — Gonzalez Saggio & Harlan LLP

(57) ABSTRACT

Described is a technology by which private content maintained behind a firewall (e.g., in a "mesh") may be searched, browsed, and accessed via an index that exists outside of the firewall. Searching of the index may include checking permissions of a user against permissions associated with metadata in the index, e.g., per watch folder into which file content is added. When content is selected, e.g., by clicking on a search result, a request is made. An application polls for such requests, and when detected, pushes a copy of the content through the firewall to the requester. The search may be performed over more than one index, with aggregated search results returned.

19 Claims, 5 Drawing Sheets

OTHER PUBLICATIONS

"Oracle Secure Enterprise Search 10G". Retrieved at<<http://www.oracle.com/technology/products/oses/pdf/OSES_10g_DS_March 2006.pdf>>, Mar. 2006, pp. 1-8.

Halm, et al."LionShare: Secure P2P File Sharing and Collaboration", Retrieved at<<http://net.educause.edu/ir/library/pdf/EDU06276.pdf>>, EDUCASE 2006, Oct. 11, 2006, pp. 41.

McKendrick Joe, "Managing Data in the Clouds", Retrieved at<<http://www.fastforwardblog.com/?author_name=jmckendrick >>, Feb. 1, 2009, pp. 32.

"Behind Live Mesh: Authorization and Encryption". Retrieved at<<http://blogs.msdn.com/livemesh/archive/2008/05/29/behind-live-mesh-authorization-and-encryption.aspx>>, pp. 8.

Trevor, et al."AnySpot: Pervasive Document Access and Sharing", Retrieved at<<http://ieeeexplore.ieee.org/stamp/stamp.jsp?arnumber=4287747&isnumber=4287430>>, Published by the IEEE Computer Society, 2007, pp. 76-84.

\* cited by examiner

CONTENT MESH SEARCHING

BACKGROUND

Many schools and other institutions have content stores on servers that are difficult for members of the institutions to access in an easy, yet secure way. In general, access is either not feasible or is expensive/labor intensive to set up through custom work. Alternatively, access is only available when an end user is inside the firewall on the network. This does not meet the needs of users who want to search and/or access files when they are off network or want to search and/or access files from a variety of locations on the network.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a content maintained behind a firewall may be searched via an index outside of the firewall. Further, search results that are returned may be interacted with by a user (e.g., clicked-on), in order to request content. In one implementation, the content maintained behind a firewall is maintained in a mesh (e.g., internet storage based upon Microsoft Corporation's Live Mesh™ technology), with watch folders monitored to detect any change to the content, which is then indexed.

Searching of the index may include checking permissions of a searching entity (e.g., user) against permissions associated with metadata in the index. The association with the permissions may be per watch folder. The search may be performed over more than one index, and the search results may be aggregated.

When content is requested, e.g., by interaction with (clicking on) a search result, a request is made. An application behind the firewall polls for such requests, and when detected, pushes a copy of the content to the requester. This copy may be read-only or not. This copy may be pushed through the firewall to the user or may be a copy stored on one or more servers in the cloud.

Other advantages may become apparent from the following detailed description when taken in conjunction with the drawings.

BRIEF DESCRIPTION OF THE DRAWINGS

Embodiments of the present invention are illustrated by way of example and not limited in the accompanying figures in which like reference numerals indicate similar elements and in which.

DETAILED DESCRIPTION

Various aspects of the technology described herein are generally directed towards helping users find and access relevant content, including by allowing users to access content behind firewalls on servers. To this end, a searching entity (e.g., user, group, domain and so forth) with appropriate permissions (e.g., fully public, specific domain, specific group, specific ID, and so forth) is able to search an index of metadata maintained on the "cloud" that references selected content of an appropriately configured server. Further, as described below, the user is generally able to access the searched content by requesting a copy, which the server then delivers. In addition to an end user searching as a method of requesting a set of results, a system may also pre-populate a browse style page listing all of the items to which an end user has access.

In general, this is accomplished via "mesh searching" technology which gives users the ability to search over content to which they have permission to access, but heretofore were unable to search or access when roaming because of a firewall. Mesh searching enables an institution, corporation, individual, or any other entity to share content files that are searched by appropriate users, and also ensure ongoing, controlled sharing when new content is created or if considerations need to be changed on previously created or shared content or files. Mesh searching also allows users to easily share files with other users simply by saving a file to a specific server container; (for example, folders are used as the container in one implementation because it is easy for even non-technical users to perform sharing by simply dropping a file into an watched folder, whereby it gets indexed and possibly shared depending on the folder's settings; however another suitable container or way to designate content, including as an individual file, by file type and so forth may be used). An enterprise is thus able to share a file maintained behind a firewall with searchers in a controlled manner that is straightforward to set up, as well as easy for end users to use.

While the examples described herein include the use of Windows® Live Mesh technologies, FAST search, and Windows® Live ID, it is understood that these are only examples, and that the technology may be implemented using many alternatives. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, searching and file access in general.

Figure 1:
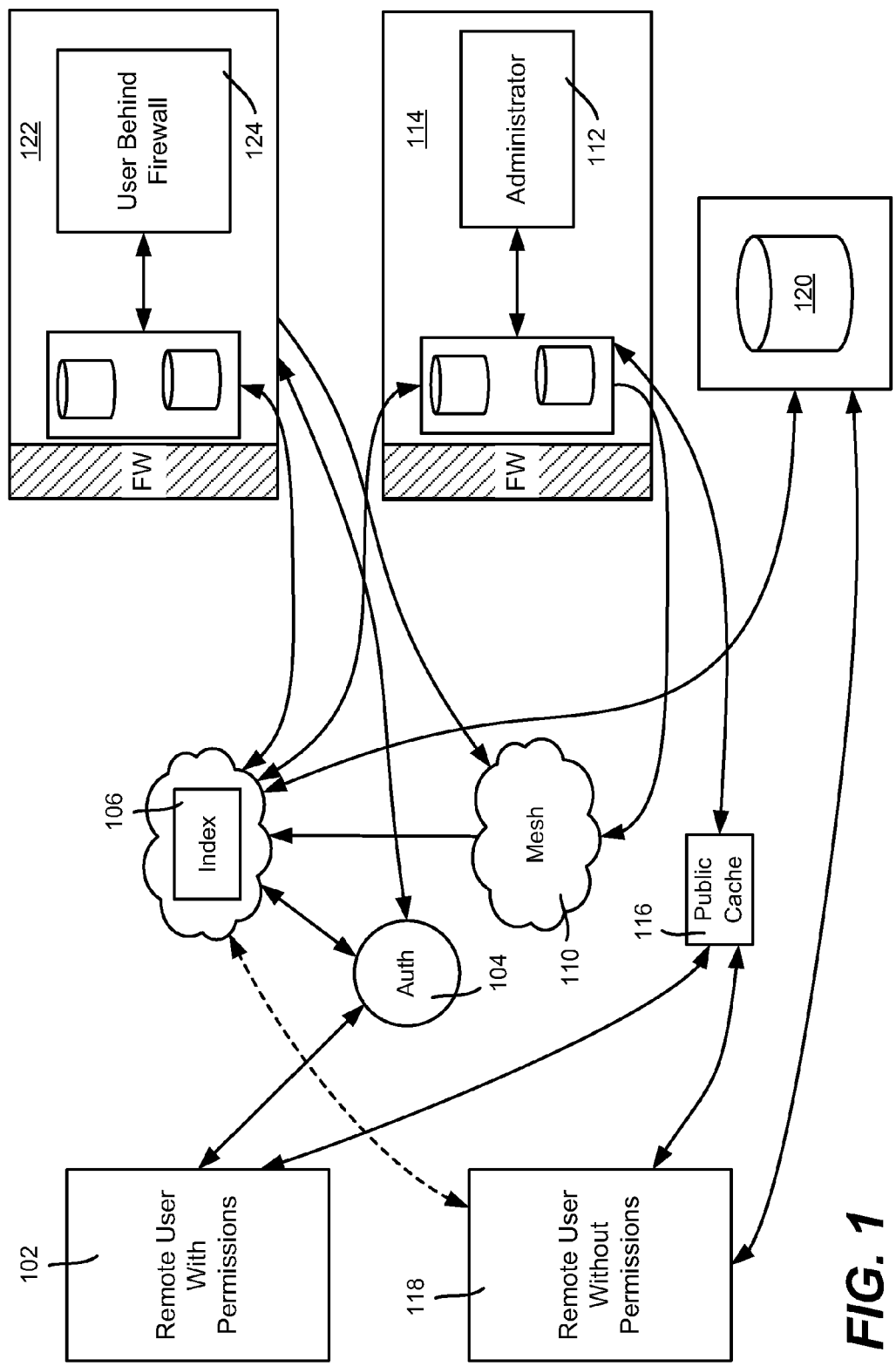
FIG. 1 is a block diagram representing a network that allows searching of private content that is maintained behind a firewall via an index that is not maintained behind the firewall.

Turning to FIG. 1, there is shown a representation of a mesh searching environment in which a remote user 102 with appropriate permissions granted by an authentication mechanism 104 (e.g., a service such as Windows® Live ID) is able to search for content that is maintained behind a firewall (FW) and/or in a mesh. Further, the user is generally able to request and have delivered a copy of each piece of content that is referenced in the search results. Note that the use of Windows® Live ID allows a user to potentially search various indexes (e.g., of different institutions) with a single user ID and password.

To this end, the user 102 searches for content via an index 106 of metadata that is maintained in a "cloud" service. The metadata may be anything that the source (e.g., an enterprise, institution or even a single user) wants to have indexed, such as the title of each file, its first few lines, first paragraph, or first N words of the document, file name, subject, tags, categories, comments, author, subject, keywords, size, date and so forth. Note that this technology further allows anyone to deliver content from a personal computer with a connection to the internet for example, and have that content gets indexed so as to be searchable, without having to set up a website.

As described below, to provide for access from any suitable location, the index 106 is not maintained behind the firewall but at a cloud location. In one implementation, the content may be accessed via a mesh 110, as also described below. Thus, the index 106 may be built by accessing the mesh 110 to process the content, although an administrator may choose to only output metadata regarding some or all of the content. It is also feasible to build the index on the server and then output the index outside of the firewall.

As will be understood, an administrator-level user or otherwise authorized advanced-level user (referred to as an administrator 112 in general hereinafter) sets up a watch folder on a content server 114 so as to determine what content is indexed, what content is accessible and what permissions are needed to search the index and/or access content. In other words, the administrator 112 behind the firewall decides what level of permission goes with which metadata, and which content. Note that an administrator working on one machine behind a firewall can configure content across multiple machines behind that firewall. An institution may set up different levels of administrators with the ability to do different tasks. The administrator may also be set up to configure content on machines behind the firewall, from a location outside of the firewall.

As also represented in FIG. 1, the administrator 112 is able to set up other content that is public, e.g., accessed by a public cache 116 including by a user without permissions (block 118). This gives an option to publicly release select documents, for example, and cache them for efficient access.

As described below, the user 102 may also get search results from the internet 120 or other public sources, as well as content from a different server 122 behind a different firewall. Indeed, searching via the index 106 may obtain more results than does a user 124 behind the firewall (unless that user 124 also goes to the cloud index 106). This is valuable in many ways, e.g., a university with two different campuses each behind a firewall can have its content indexed from both; a user can search both together, can get documents from either server and so forth, and can also have private search results combined with public internet content search results.

Figure 2:
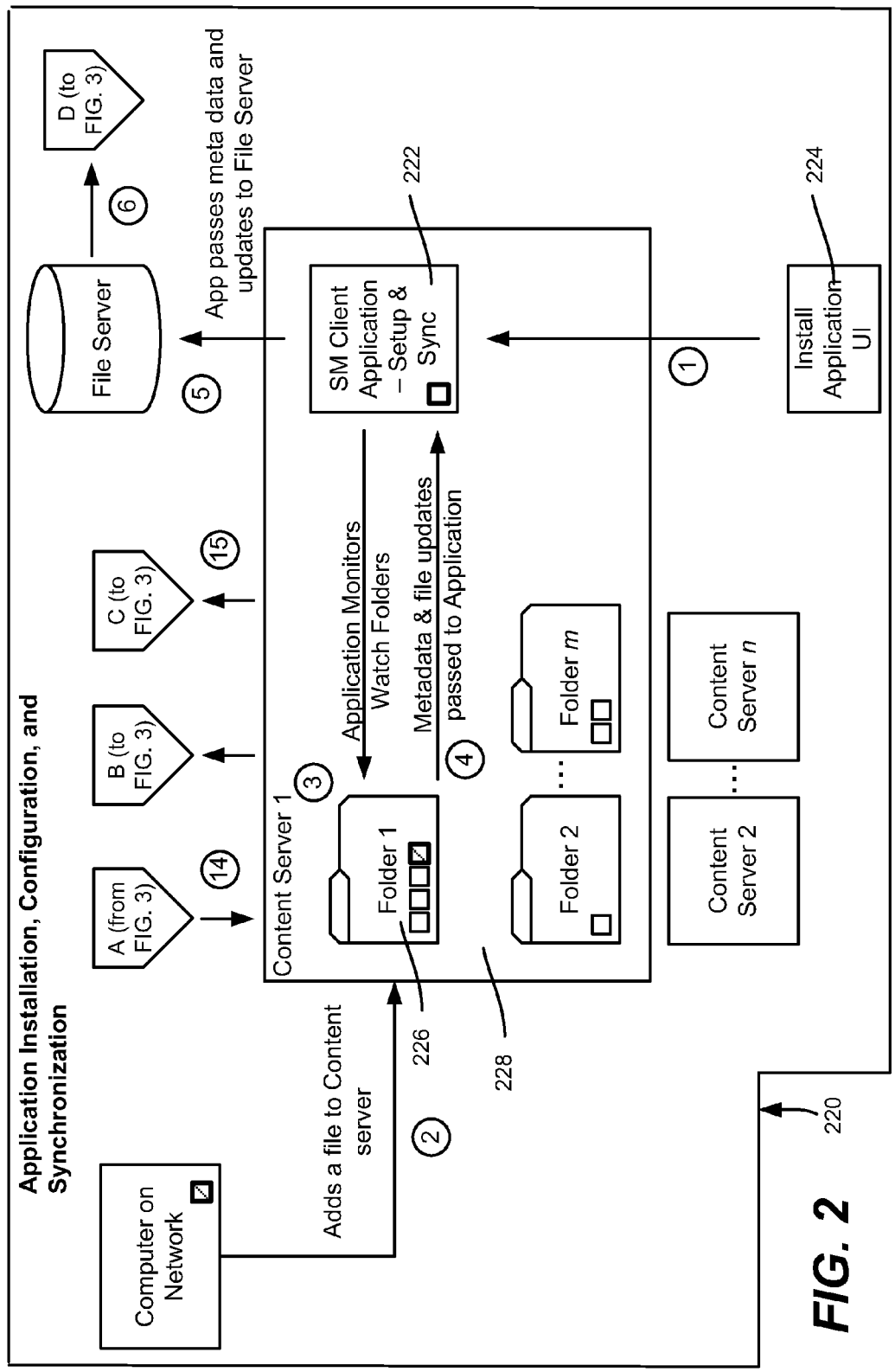
FIG. 2 is a diagram representing example components for application installation, configuration, and synchronization
Figure 3:
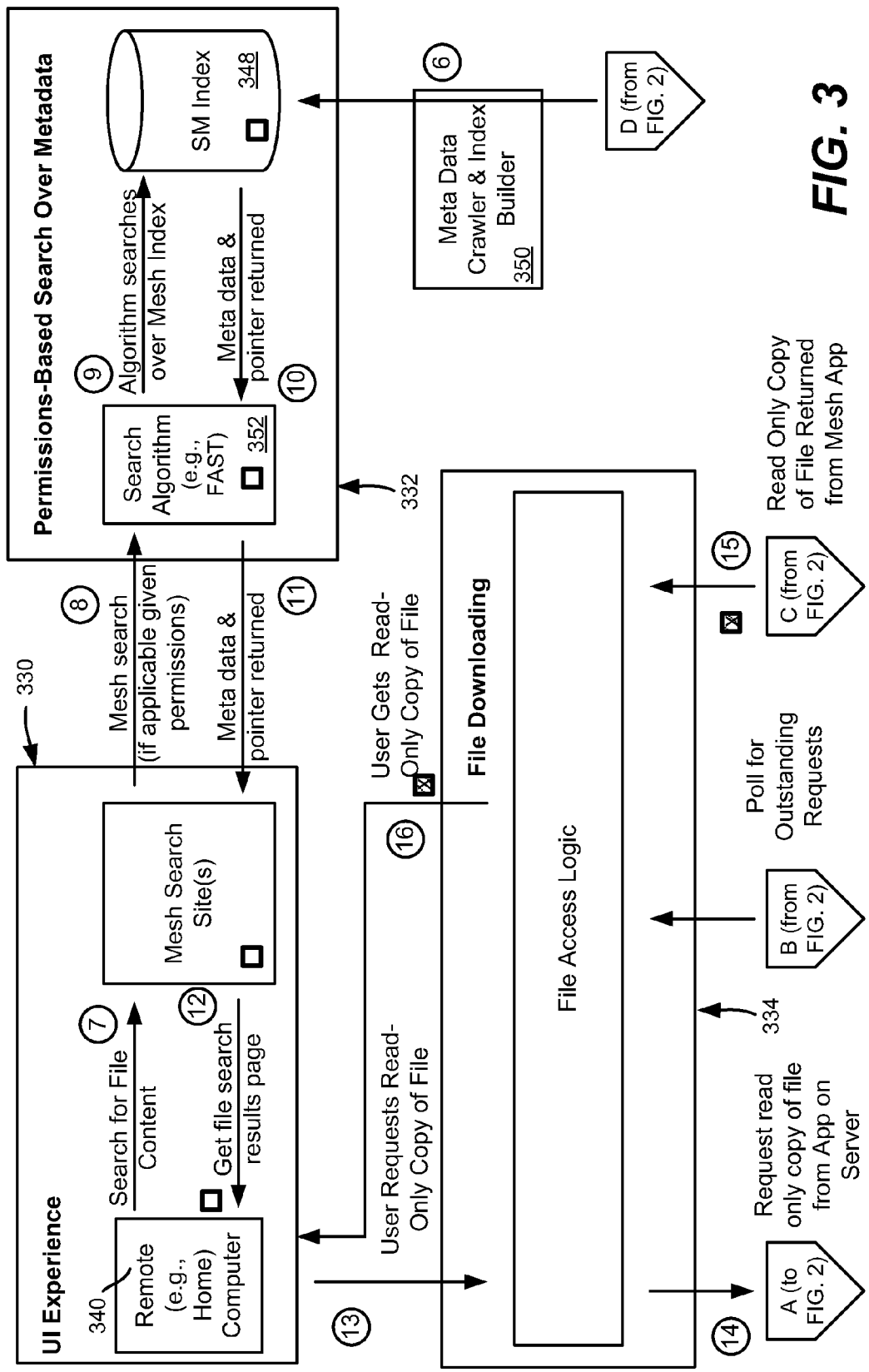
FIG. 3 is a diagram showing components that communicate with the components of FIG. 2 and/or each other, including for indexing and file downloading to a user interface.

As represented in FIGS. 2 and 3, mesh searching includes four general aspects, namely 1) application installation, configuration, and synchronization (block 220); 2) Internet user UI experience (block 330); 3) permissions-based search over metadata (block 332); and 4) file downloading (block 334).

The application installation, configuration, and synchronization aspect is directed to the server application 222 (or applications) that the administrator uses to define which servers and which folders to keep updated for mesh searching data, as well as who has access to view the corresponding search results. These servers may be located across a variety of network or physical locations. Note that the "application" may be an operating system component or other logic, and thus while exemplified herein as an application, may be any logic such as program code.

In general as represented by the arrow labeled one (1) in FIG. 2, to install the application 222 on a given server machine, one or more user interfaces 224 are presented to the administrator. This allows setting up one or more watch folders (e.g., Folder 1) 226 on one or more servers (e.g., Server 1) 228 and to set up permissions for use in searching and requesting content. Permissions may be defined for any searching entity, e.g., identified by domain, organizational unit, Active Directory®, individual user, administrator, or group, such as a list of user IDs, a group ID, or public access. Note that further code may be present that facilitates upgrades/patches to the server application 222 and other logic (e.g., background processes) over time.

As represented in FIG. 2, the other folders that are shown (e.g., Folder 2 through Folder m) may or may not similarly be watched. Also note that the other servers shown (e.g., Server 2 through Server n) may have folders that are watched or not watched, and may reside on multiple networks/intranets. Because the application 222 is used for the index watching and synchronization, as well as for handling requests for content, only those servers loaded with the server application are searchable, and only those folders that are designated as watch folders are indexed. The administrator also decides what permissions to associate with each folder, and whether the file metadata or file content is maintained outside the firewall.

When a file is added to a watch folder (the arrow labeled two (2)), such as by a teacher in an educational environment, the application 222 detects the change, and notifies the system (e.g., including a file server 230) to relevant changes to files in the watch folders (the arrows labeled three (3) through six (6)). Over time, as users add/edit/delete files within the watch folders on watched servers, the application 222 synchronizes metadata and file updates from a content server at the institution to the file server 230 or database in another location (e.g., in a corporate server farm, but alternatively in any suitable storage location). Note that the application 222 pushes changes to the index, (and as described below, polls for requests for content; in one implementation this is done via the application 222, but equivalently may be done via separate applications). As with synchronization models, the changes may be the entire content, or appropriate notifications with deltas; alternatively (or in addition), the index may poll for whether the application has changes.

To summarize, the technology enables sharing files through search with appropriate users in a secure way by installing a small application on their content servers, defining watched folders, and defining permissions lists. This allows users to easily share files with other users simply by saving a file to a specific watched folder. Thus, the application 222 monitors data newly shared folders, new files in shared folders, changed/removed metadata and files and sub-folders in shared folders, permissions changes for folders, metadata versus full index data exchange changes in shared folders.

Note that there is an administrator-controlled mechanism to temporarily pause a folder share (that is, stop sharing, but do not purge the data), or to purge to remove a folder's data.

The Internet user UI experience (block 330) includes the UI that a user sees when visiting a search results page when the user has been given access to search the index and thereby view search results from a given mesh searching system. This UI may be on an internet facing webpage, in a private browser instance, in a client application, on a mobile device through SMS, WAP or mobile browser, and so forth. These UI options are represented in FIG. 3 via the remote computer 340.

In FIG. 3, the arrows labeled seven (7) through twelve (12) represent the search process. If there are mesh searching results to return to a user, then those results may be displayed in a separate, labeled area on a search results page/list or combined with (e.g., integrated into) other search results. In one implementation, the UI handles results from multiple providers in a unified list, if needed.

Figure 4:
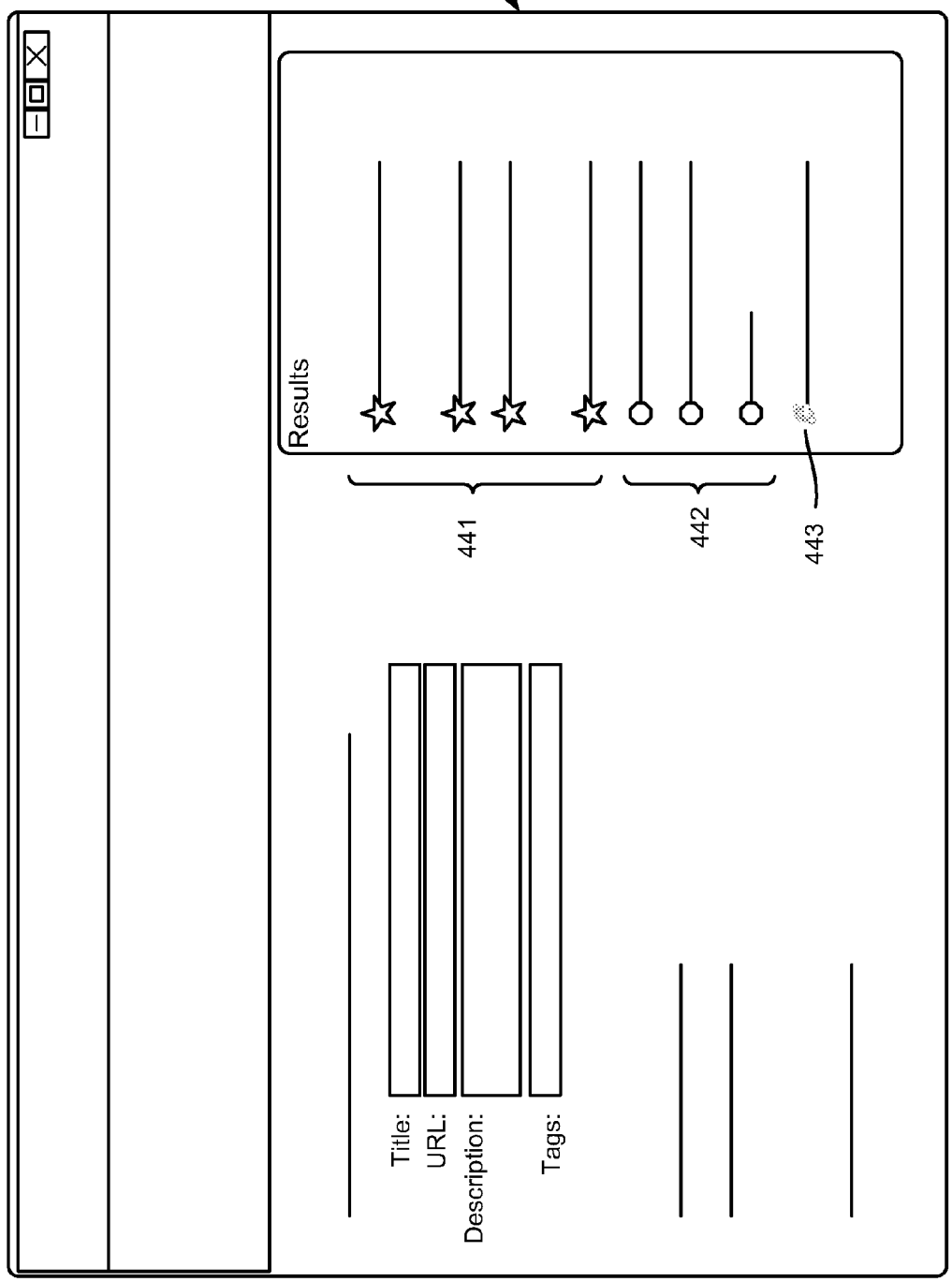
FIG. 4 is a representation of an example screen shot showing how search results may be aggregated and returned in response to a search request including a search of private content.

FIG. 4 shows an example search results page 440, in which a user may have results aggregated and/or merged from different sources (e.g., different educational institutions). This may be done by having a merged index built from various content sources, and/or by searching the indexes of different institutions and then combining the results. Metadata such as a logo (e.g., 441-443) representing each source index may be used help the user determine where the content corresponding to each search result originated. The results may be aggregated and presented in any way, e.g., interleaved based on relevance, separated by source, based upon commercial payments, separated such that public and private results are in different sections, and so forth.

If there are no mesh searching results to return, then a custom "no results" message may be displayed, and/or any custom sections not displayed.

The permissions-based search over metadata aspect (block 332) is directed towards the search and permissions infrastructure and logic used to generate the search results and control who sees the results. Credentials are used and matched to the content that each user can search for and receive, (except for metadata and/or content that is put into the public domain via the administrator-determined settings).

The metadata provided by the mesh searching application is crawled to create a mesh searching index 348. As represented by the block 350, this can be done using an existing crawler or by other suitable code. The search algorithm 352 (e.g., based upon FAST technology) that is used to search over the index 350 can also be done using existing code or by creating custom code.

In general, when an administrator sets up mesh searching, the administrator defines the permissions for access to those results. Mesh searching code honors this permission structure so that users only see the mesh searching results to which they are allowed to have access.

The file downloading aspect (block 334) is directed towards the file return and permissions logic used to let user obtain a copy of content corresponding to a mesh searching result that the user found. Similar to when a user clicks on a search result in a web search engine and gets a copy of the web page file, file downloading allows users to retrieve a copy of the files they find in the mesh searching results.

The same permissions levels and logic that apply to getting mesh searching results may apply with respect to file downloading. Note however that the administrator may allow items to be searched via the index but not downloaded, as the metadata and file content may have different permissions. For example, some or all of the indexed content may be available for the public to search, such as to advertise content as available to the general public; a user without appropriate permissions user will then need to contact the institution for a full copy.

As represented in FIGS. 2 and 3 via the arrows labeled thirteen (13) through sixteen (16), the user requests a file via a cloud service. However, because of the firewall, the server application 222 needs to open a port to push the file through the firewall. Thus, the server application 222 also polls the cloud service for outstanding requests for content, and satisfies those by delivering content to users having the proper permissions.

As can be seen, multiple nodes of content may be configured so as to let defined searchers search over files in a defined set of watch folders that automatically result in index updates as changes are made, e.g., so that any other user may share a file in a secured manner by saving it to a watch folder. One implementation leverages live mesh code to manage file notifications, however this may be alternatively completed with any synchronization process in which a client maintains timely connectivity with a cloud process.

Figure 5:
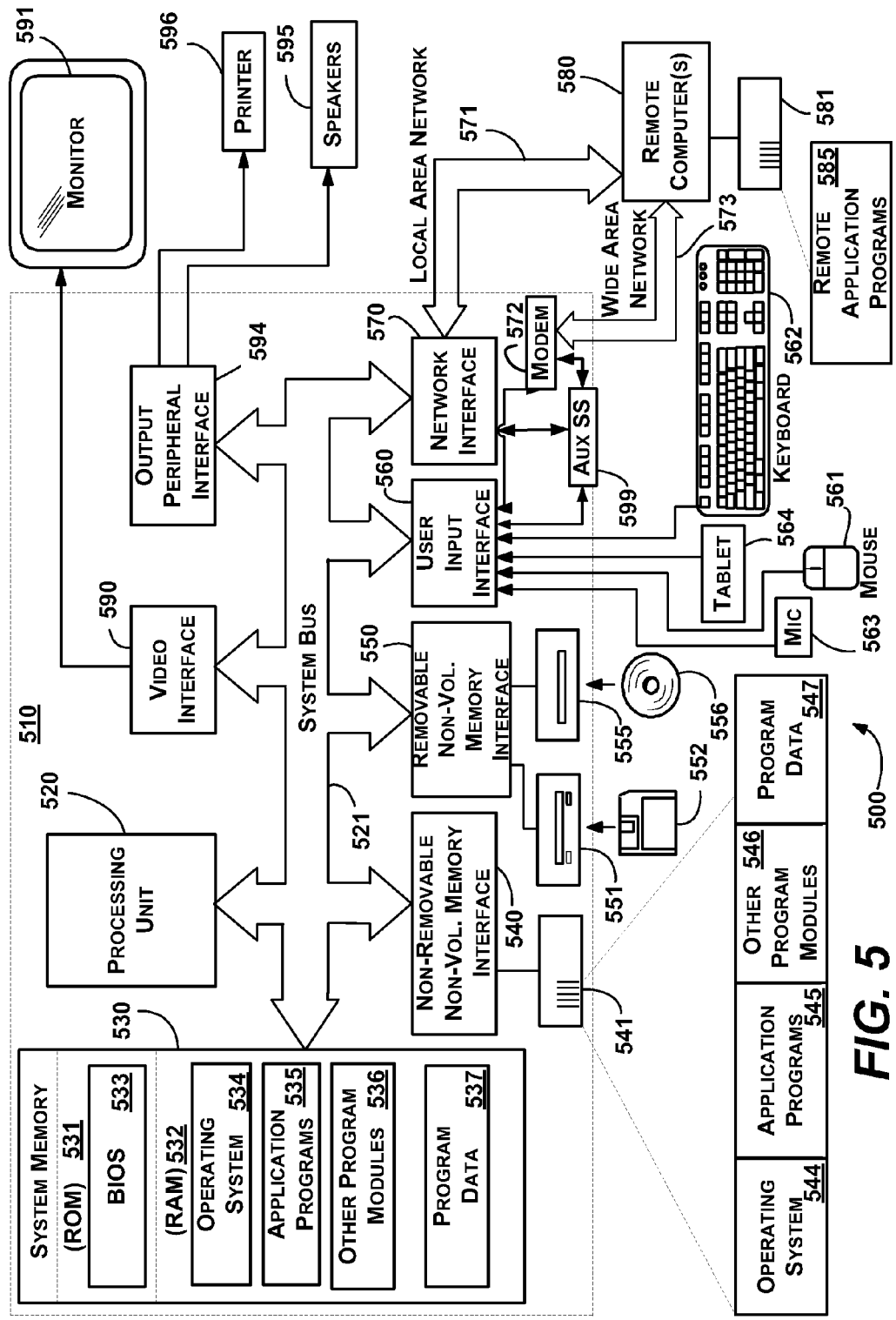
FIG. 5 shows an illustrative example of a computing environment into which various aspects of the present invention may be incorporated.

In this manner, an authenticated user may search over metadata from files in watch folders. Note that one implementation leverages FAST search code for the search functionality, however, this is only one implementation and many alternative mechanisms are feasible. Once located, an authenticated user may access a file that is located behind a firewall by clicking on a link in a website to get a copy of that file Exemplary Operating Environment FIG. 5 illustrates an example of a suitable computing and networking environment 500 into which the examples and implementations of any of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a computing environment, a method performed at least in part by at least one processor, comprising:
storing content behind a firewall;
maintaining an index to the content, in which the index is maintained outside of the firewall;
allowing searching of the index to provide search results with respect to the content, including checking permissions of a searching entity against permissions associated with metadata in the index; and
providing access to the content from the search results.

2. The method of claim 1 wherein the content is maintained on a server, and wherein maintaining the index comprises executing logic on the server to monitor changes to the content.

3. The method of claim 1 wherein the content is maintained in a watch folder, and wherein maintaining the index comprises running logic on the server to monitor changes to the watch folder.

4. The method of claim 1 wherein the content is maintained on a server, and wherein maintaining the index comprises running logic on the server to monitor changes to metadata associated with the content.

5. The method of claim 1 wherein providing access to the content via interaction with the search results comprises polling for requests to receive the content.

6. The method of claim 1 wherein providing access to the content via interaction with the search results comprises providing the content via a mesh.

7. The method of claim 6 wherein maintaining the index to the content comprises building the index from the content by accessing the mesh.

8. The method of claim 1 wherein maintaining the index to the content comprises building the index from metadata corresponding to the content.

9. In a computing environment, a system comprising:
a content server behind a firewall configured to store a set of content, wherein the set of content is maintained in a mesh; and
logic, executed on the content server, configured to monitor changes to the set of content, and configured to output data associated with the set of content outside of the firewall by which an index to the content is built for searching outside of the firewall, wherein the index is built outside of the firewall by accessing the set of content via the mesh.

10. The system of claim 9 wherein the data associated with the set of content comprises metadata.

11. The system of claim 9 wherein the set of content is maintained in one or more watch folders, and wherein the logic runs on the content server to monitor the watch folders.

12. The system of claim 11 wherein each watch folder is associated with one or more permissions, and wherein the permissions of a searching entity determine which search results are returned from the index.

13. The system of claim 9 wherein the logic provides access to the content via interaction with the search results.

14. The system of claim 9 further comprising means for aggregating search results from a plurality of indexes into aggregated search results, means for receiving a request to access content based upon interaction with the search results, and means for returning the content in response to the request.

15. The system of claim 9 wherein the content server is configured to allow access to the content via the mesh.

16. A computer-readable storage device having computer-executable instructions stored thereon, which when executed by a computer, cause the computer to perform steps comprising:
generating an index of at least a portion of a plurality of data on the computer, wherein the computer is communicatively connected to a communications network through a firewall;
storing the index outside of the firewall;
allowing searching of the index, by one or more other computers separated from the computer by the firewall, to provide search results with respect to the portion of the plurality of data, including checking permissions of a searching entity against permissions associated with metadata in the index; and
providing access to the portion of the plurality of data from the search results.

17. The computer-readable storage device of claim 16, having further computer-executable instructions stored thereon, which when executed by the computer, cause the computer to perform steps further comprising:
maintaining the index by monitoring changes to the portion of the plurality of data.

18. The computer-readable storage device of claim 17, wherein the monitoring changes to the portion of the plurality of data includes monitoring changes to metadata related to the portion of the plurality of data.

19. The computer-readable storage device of claim 16, wherein the providing access to the portion of the plurality of data is via a mesh.

* * * * *